US008538333B2

(12) United States Patent
Jain et al.

(10) Patent No.: US 8,538,333 B2
(45) Date of Patent: Sep. 17, 2013

(54) MEDIA EXPOSURE LINKING UTILIZING BLUETOOTH SIGNAL CHARACTERISTICS

(75) Inventors: Anand Jain, Ellicott City, MD (US); John Stavropoulos, Edison, NJ (US); Alan Neuhauser, Silver Spring, MD (US); Vladimir Kuznetsov, Ellicott City, MD (US); Jack Crystal, Owings Mills, MD (US); Wendell Lynch, East Lansing, MI (US)

(73) Assignee: Arbitron Inc., Columbia, MD (US)

( * ) Notice: Subject to any disclaimer, the term of this patent is extended or adjusted under 35 U.S.C. 154(b) by 94 days.

(21) Appl. No.: 13/327,943

(22) Filed: Dec. 16, 2011

(65) Prior Publication Data
US 2013/0157568 A1 Jun. 20, 2013

(51) Int. Cl.
*H04B 7/00* (2006.01)
(52) U.S. Cl.
USPC ..... 455/41.2; 455/3.01; 455/3.05; 455/456.1; 455/456.5; 455/67.11; 455/67.13; 455/68; 455/69
(58) Field of Classification Search
USPC ................ 455/3.01, 3.05, 3.06, 456.1, 456.5, 455/456.6, 457, 41.2, 500, 507, 509, 513, 455/514, 67.11, 67.13, 68, 69
See application file for complete search history.

(56) References Cited

U.S. PATENT DOCUMENTS

| 7,102,640 | B1 * | 9/2006 | Aholainen et al. | 345/440 |
|---|---|---|---|---|
| 7,254,406 | B2 * | 8/2007 | Beros et al. | 455/456.3 |
| 7,889,686 | B1 | 2/2011 | Chang | |
| 8,036,600 | B2 * | 10/2011 | Garrett et al. | 455/41.2 |
| 8,209,434 | B2 * | 6/2012 | Wendelrup et al. | 709/239 |
| 8,335,473 | B2 * | 12/2012 | Liao | 455/41.2 |
| 2004/0203362 | A1 | 10/2004 | Pattabiraman | |
| 2007/0237102 | A1 * | 10/2007 | Trott | 370/310 |
| 2008/0033903 | A1 * | 2/2008 | Carol et al. | 707/1 |
| 2008/0112346 | A1 | 5/2008 | Tolpin | |
| 2010/0222087 | A1 * | 9/2010 | Dragt | 455/466 |
| 2011/0025914 | A1 * | 2/2011 | Mcrae et al. | 348/552 |
| 2011/0028093 | A1 * | 2/2011 | Patel et al. | 455/41.2 |
| 2012/0063427 | A1 * | 3/2012 | Kandekar et al. | 370/338 |
| 2012/0300944 | A1 * | 11/2012 | Spittle | 381/17 |

OTHER PUBLICATIONS

International Search Report & Written Opinion in PCT/US12/70162 dated Mar. 4, 2013.

* cited by examiner

*Primary Examiner* — Tuan A Tran
(74) *Attorney, Agent, or Firm* — Barnes & Thornburg LLP

(57) ABSTRACT

A computer-implemented method for establishing media data exposure for a computer processing device, where media data received in the computer processing device. The computer processing device pairs itself with a plurality of portable computing devices using a Bluetooth connection when media data is received. A signal strength characteristic of the Bluetooth connection is established in the computer processing device for each of the paired plurality of portable computing devices. Each signal strength characteristic with the received media data is then established to determine which signal strength characteristic is the strongest when the media data was received in the computer processing device.

20 Claims, 6 Drawing Sheets

MEDIA EXPOSURE LINKING UTILIZING BLUETOOTH SIGNAL CHARACTERISTICS

TECHNICAL FIELD

The present disclosure is directed to processor-based audience analytics. More specifically, the disclosure describes systems and methods for combining characteristics of Bluetooth signals with research data to identify and characterize devices and their accompanying users associated with media consumption.

BACKGROUND INFORMATION

Bluetooth is a proprietary open wireless technology standard for exchanging data over short distances from fixed and mobile devices, creating personal area networks (PANs) with high levels of security. Bluetooth uses a radio technology called frequency-hopping spread spectrum, which divides the data being sent and transmits portions of it on up to 79 bands (1 MHz each, preferably centered from 2402 to 2480 MHz) in the range 2,400-2,483.5 MHz (allowing for guard bands). This range is in the globally unlicensed Industrial, Scientific and Medical (ISM) 2.4 GHz short-range radio frequency band. Gaussian frequency-shift keying (GFSK) modulation may be used, however, more advanced techniques, such as π/4-DQPSK and 8DPSK modulation may also be used between compatible devices. Devices functioning with GFSK are said to be operating in "basic rate" (BR) mode where an instantaneous data rate of 1 Mbit/s is possible. "Enhanced Data Rate" (EDR) is used to describe π/4-DPSK and 8DPSK schemes, each giving 2 and 3 Mbit/s respectively. The combination of these (BR and EDR) modes in Bluetooth radio technology is classified as a "BR/EDR radio".

Bluetooth is a packet-based protocol with a master-slave structure. One master may communicate with up to 7 slaves in a piconet, where all devices preferably share the master's clock. Packet exchange is based on the basic clock, defined by the master, which may tick at 312.5 µs intervals. In the simple example of single-slot packets, the master transmits in even slots and receives in odd slots; the slave, conversely, receives in even slots and transmits in odd slots. Packets may be 1, 3 or 5 slots long but in all cases the master transmit will begin in even slots and the slave transmit in odd slots.

Bluetooth provides a secure way to connect and exchange information between devices such as faxes, mobile phones, telephones, laptops, personal computers, printers, Global Positioning System (GPS) receivers, digital cameras, and video game consoles. At any given time, data can be transferred between the master and one other device. The master may choose which slave device to address and may switch rapidly from one device to another in a round-robin fashion. In the area of computer processors, Bluetooth is commonly used to operationally link devices to the computer processor. In other cases, Bluetooth signals are used to "unlock" a computer processor when an enabled device is within a certain proximity.

One area where improvements are needed is in the area of media exposure tracking and web analytics. To date, Bluetooth has been relatively underutilized in this area. What is needed are methods, systems and apparatuses for utilizing Bluetooth signal characteristics in conjunction with media exposure data to produce research data that accurately identifies and characterizes devices, and their accompanying users.

SUMMARY

Accordingly, apparatuses, systems and methods are disclosed for computer-implemented techniques for establishing media data exposure for a computer processing device, where media data is received in the computer processing device, which pairs itself with a plurality of portable computing devices (e.g., smart phone, PPM™, tablet, laptop, etc.) using a Bluetooth connection when media data is received. A signal strength characteristic of the Bluetooth connection is established in the computer processing device for each of the paired plurality of portable computing devices. Each signal strength characteristic is then associated with the received media data to determine which signal strength characteristic is the strongest when the media data was received in the computer processing device. The exposure data comprises at least one of a cookie, a logfile and a page tag, while the media data comprises at least one of audio, video, audio/video, text, an image, a web page and streaming media. The signal strength characteristic of the Bluetooth connection comprises at least one of a Received Signal Strength Indicator (RSSI) value, a Transmit Power Level (TPL) value and a Link Quality (LQ) value.

Under another embodiment, apparatuses, systems and methods are disclosed for computer-implemented techniques for establishing media data exposure for a computer processing device. Media exposure data is stored relating to media data received in the computer processing device, as well as pairing data of the computer processing device with a plurality of portable computing devices using a Bluetooth connection when media data is received. A signal strength characteristic of the Bluetooth connection is received for each of the paired plurality of portable computing devices and each signal strength characteristic is associated with the received media data to determine which signal strength characteristic is the strongest when the media data was received in the computer processing device. The strongest signal strength characteristic then associated with the media exposure data. The exposure data comprises at least one of a cookie, a logfile and a page tag, while the media data comprises at least one of audio, video, audio/video, text, an image, a web page and streaming media. The signal strength characteristic of the Bluetooth connection comprises at least one of a Received Signal Strength Indicator (RSSI) value, a Transmit Power Level (TPL) value and a Link Quality (LQ) value.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
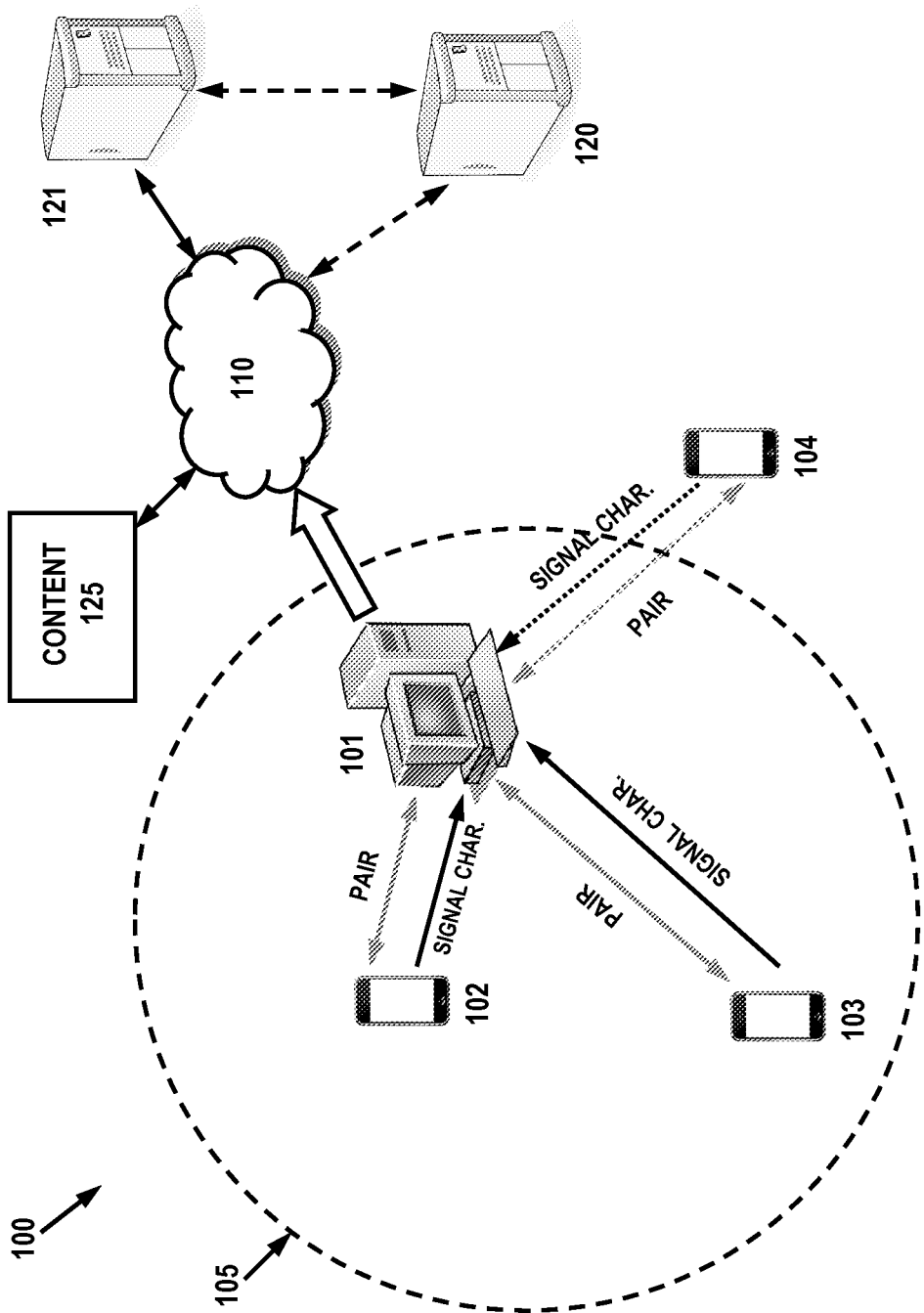
FIG. 1 illustrates an exemplary system under one embodiment, where media data is provided from a network to a processing device in the vicinity of a plurality of portable devices.

FIG. 1 illustrates an exemplary system 100 that comprises a computer processing device 101 and a plurality of portable computing devices (102-104) that are in the vicinity of processing device 101. In this example, processing device 101 is illustrated as a personal computer, while portable computing devices 102-104 are illustrated as Bluetooth-enabled cell phones. It is understood by those skilled in the art that other similar devices may be used as well. For example, processing device 101 may also be a laptop, a computer tablet, a set-top box, a media player, a network-enabled television or DVD player, and the like. Portable computing devices 102-104 may also be laptops, PDAs, tablet computers, Personal People Meters™ (PPMs), wireless telephone, etc.

Under a preferred embodiment, processing device 101 connects to content source 125 via network 110 to obtain media data. The terms "media data" and "media" as used herein mean data which is widely accessible, whether over-the-air, or via cable, satellite, network, internetwork (including the Internet), displayed, distributed on storage media, or by any other means or technique that is humanly perceptible, without regard to the form or content of such data, and including but not limited to audio, video, audio/video, text, images, animations, databases, broadcasts, displays (including but not limited to video displays), web pages and streaming media. As media is received on processing device 101, analytics software residing on processing device 101 collects information relating to media data received from content source 125, and additionally may collect data relating to network 110.

Data relating to the media data may include a "cookie", also known as an HTTP cookie, which can provide state information (memory of previous events) from a user's browser and return the state information to a collecting site, which may be the content source 125 or collection site 121 (or both). The state information can be used for identification of a user session, authentication, user's preferences, shopping cart contents, or anything else that can be accomplished through storing text data on the user's computer. When setting a cookie, transfer of content such as Web pages follows the HyperText Transfer Protocol (HTTP). Regardless of cookies, browsers request a page from web servers by sending a HTTP request. The server replies by sending the requested page preceded by a similar packet of text, called "HTTP response". This packet may contain lines requesting the browser to store cookies. The server sends lines of Set-Cookie only if the server wishes the browser to store cookies. Set-Cookie is a directive for the browser to store the cookie and send it back in future requests to the server (subject to expiration time or other cookie attributes), if the browser supports cookies and cookies are enabled. The value of a cookie can be modified by sending a new Set-Cookie: name=newvalue line in response of a page request. The browser then replaces the old value with the new one. Cookies can also be set by JavaScript or similar scripts running within the browser. In JavaScript, the object document.cookie is used for this purpose.

Various cookie attributes can be used: a cookie domain, a path, expiration time or maximum age, "secure" flag and "HTTPOnly" flag. Cookie attributes may be used by browsers to determine when to delete a cookie, block a cookie or whether to send a cookie (name-value pair) to the collection site 121 or content site 125. With regard to specific "cookies", a session cookie may be used, which typically only lasts for the duration of users using the website. A web browser normally deletes session cookies when it quits. A session cookie is created when no expires directive is provided when the cookie is created. In another embodiment, a persistent cookie (or "tracking cookie", "in-memory cookie") may be used, which may outlast user sessions. If a persistent cookie has its Max-Age set to 1 year, then, within the year, the initial value set in that cookie would be sent back to a server every time a user visited that server. This could be used to record information such as how the user initially came to the website. Also, a secure cookie may be used when a browser is visiting a server via HTTPS, ensuring that the cookie is always encrypted when transmitting from client to server. An HTTPOnly may also be used. On a supported browser, an HTTPOnly session cookie may be used for communicating HTTP (or HTTPS) requests, thus restricting access from other, non-HTTP APIs (such as JavaScript). This feature may be advantageously applied to session-management cookies.

Referring back to the example of FIG. 1, media data is received on processing device 101. At the time the media data is received, portable computing devices 102-104 are in the vicinity, and are configured to establish Bluetooth communication ("pair") with processing device 101. After Bluetooth communications are established, processing device 101 collects the Bluetooth signal characteristics from each portable computing device. Under a preferred embodiment, Bluetooth signal characteristics relate to status parameters of a Bluetooth connection together with any other signal strength values made available in Bluetooth Core Specification. The Host Controller Interface (HCI) (discussed in greater detail below) provides access to three such connection status parameters, including Link Quality (LQ), Received Signal Strength Indicator (RSSI), and Transmit Power Level (TPL). All these status parameters require the establishment of an active Bluetooth connection in order to be measured. Another signal parameter, referred to as "Inquiry Result with RSSI", alternately also be used, where the parameter perceives RSSI from the responses sent by its nearby devices.

Briefly, Link Quality (LQ) is an 8-bit unsigned integer that evaluates the perceived link quality at the receiver. It ranges from 0 to 255, where the larger the value, the better the link's state. For most Bluetooth modules, it is derived from the average bit error rate (BER) seen at the receiver, and is constantly updated as packets are received. Received Signal Strength Indicator (RSSI) is an 8-bit signed integer that denotes received (RX) power levels and may further denote if the level is within or above/below the Golden Receiver Power Range (GRPR), which is regarded as the ideal RX power range. As a simplified example, when multipath propagation is present, RSSI is generally based on a line-of-sight (LOS) field strength and a reflected signal strength, where the overall strength is proportional to the magnitude of the electromagnetic wave's E∩field. Thus, when there is minimal reflective interference, RSSI may be determined by 20 log (LOS+RS), where LOS is the line-of-sight signal strength and RS is the reflected signal. When reflective interference is introduced RSSI becomes 20 log (LOS−RS).

Transmit Power Level (TPL) is an 8-bit signed integer which specifies the Bluetooth module's transmit power level (in dBm). Although there are instances when a transmitter will use its device-specific default power setting to instigate or answer inquiries, its TPL may vary during a connection due to possible power control. "Inquiry Result with RSSI" works in a similar manner as a typical inquiry. In addition to the other parameters (e.g., Bluetooth device address, clock offset) generally retrieved by a normal inquiry, it also provides the RSSI value. Since it requires no active connection, the radio layer simply monitors the RX power level of the current inquiry response from a nearby device, and infers the corresponding RSSI.

For system 100, transmission may occur from direct voltage controlled oscillator (VCO) modulation to IQ mixing at the final radio frequency (RF). In the receiver, a conventional frequency discriminator or IQ down-conversion combined with analog-to-digital conversion is used. The Bluetooth configuration for each of the portable computing devices 102-104 and processing device 101 include a radio unit, a baseband link control unit, and link management software. Higher-level software utilities focusing on interoperability features and functionality are included as well. Enhanced Data Rate (EDR) functionalities may also be used to incorporate phase shift keying (PSK) modulation scheme to achieve a data rate of 2 or 3 Mb/s. It allows greater possibilities for using multiple devices on the same connection because of the increased bandwidth. Due to EDR having a reduced duty cycle, there is lower power consumption compared to a standard Bluetooth link.

As mentioned above, processing device 101 collects the Bluetooth signal characteristics from each portable computing device (102-104). At the same time, processing device 101 is equipped with software allowing it to measure media data exposure for a given period of time (e.g., a web browsing session) to produce research data. The term "research data" as used herein means data comprising (1) data concerning usage of media data, (2) data concerning exposure to media data, and/or (3) market research data. Under a preferred embodiment, when processing device 101 detects media data activity, it triggers a timer task to run for a predetermined period of time (e.g., X minutes) until the activity is over. At this time, discovery of paired devices is performed to locate each of the paired devices. Preferably, the UIDs of each device is known in advance. For each device discovered and paired, processing device 101 records each Bluetooth signal characteristic for the connection until the end of the session. Afterwards, the signal characteristics collected for each device, and the resultant research data for the session is forwarded to collection server 121 for further processing and/or analysis. Collection server 121 may further be communicatively coupled to server 120 which may be configured to provide further processing and/or analysis, generate reports, provide content back to processing device 101, and other functions. Of course, these functions can readily be incorporated into collection server 121, depending on the needs and requirements of the designer.

Continuing with the example of FIG. 1, portable computing devices 102 and 103 are illustrated as being paired and connected to processing device 101 during a media session. Being connected, the Bluetooth signal characteristics of portable computing devices 102 and 103 are collected (LQ, RSSI, TPL). Device 103 has previously been paired with processing device 101, but is outside the communication range of processing device 101, and therefore is unable to connect. Depending on the characteristic used, the portable computing device (102, 102) with the best characteristic is registered as being in closest proximity to processing device 101, and the portable device's user credited as being exposed to the media data.

Accordingly, if RSSI signal strength is used, the average RSSI values would be collected for each device or distinct MAC, and proximity would be detected. The strongest average RSSI value throughout the session would determine the device having closest proximity (device 102). Under another embodiment, the collected averaged RSSI values may be compared with averages from learned values to determine the nearest device. An average distance could be calculated using the distance between each device RSSI value and the learned values for each device. In this example, multiple samples would be taken (x1, x2, x3, x4, x5), where learned values contain multiple tuples for each device; each tuple would contain a corresponding number of learned RSSI values (x1', x2', x3', x4' x5'). For each tuple, the average distance would be calculated according to $$\sqrt{(x1'-x1)^2 + (x2'-x2)^2 + (x3'-x3)^2 + (x4'-x4)^2 + (x5'-x5)^2}$$

Under another embodiment, multiple Bluetooth signal characteristics (e.g., LQ and RSSI) may be processed for determining proximity.

Figure 2:
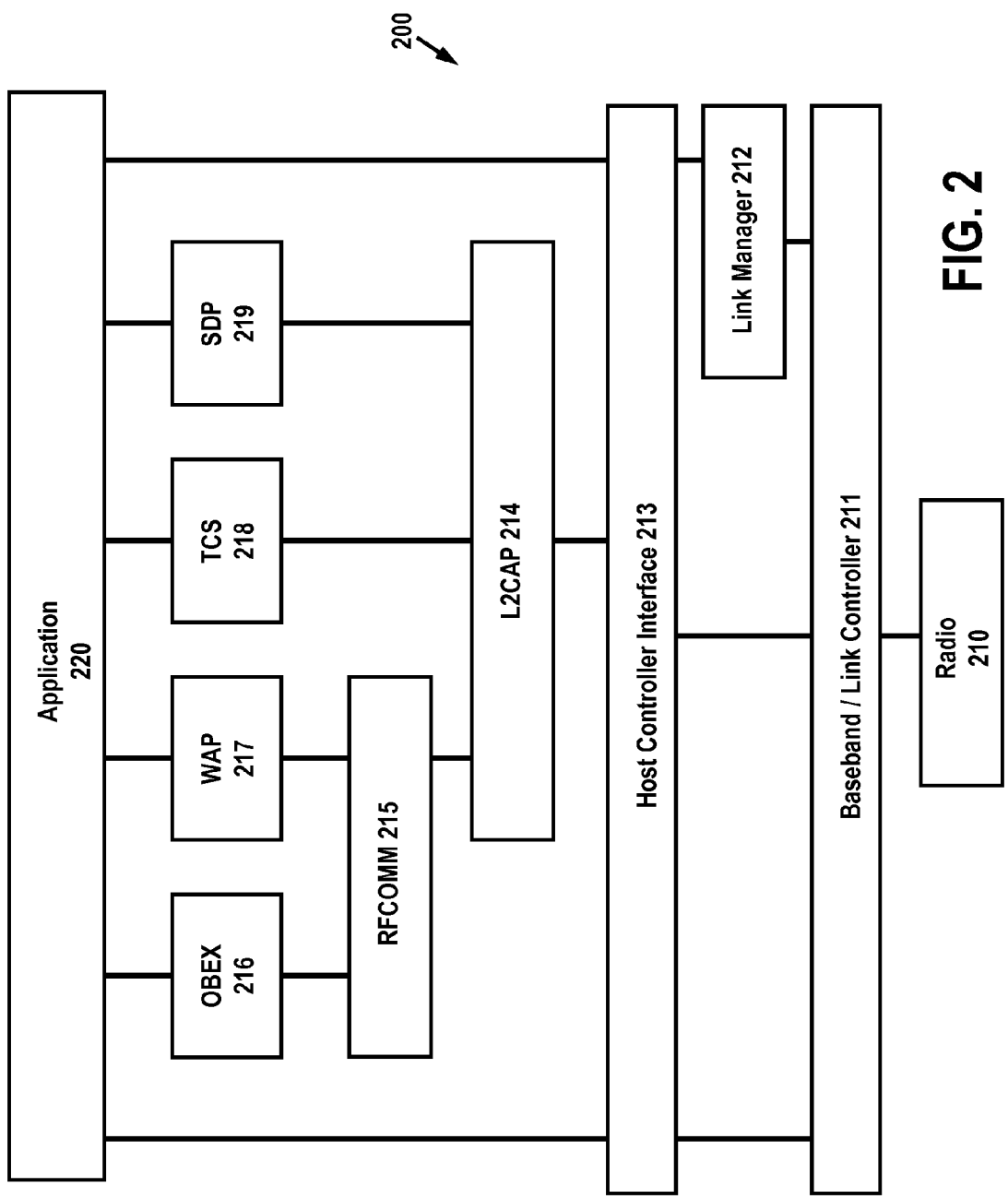
FIG. 2 illustrates an exemplary Bluetooth protocol stack utilized for communication in the embodiment of FIG. 1.

FIG. 2 shows an exemplary Bluetooth protocol stack utilized for communication in the embodiment of FIG. 1. Generally, the transition from implementation in hardware and firmware (lower layers) to software (higher layers). If each of these groups of layers are separate entities, such as a PC card and laptop computer, then they can communicate with each other through Host Controller Interface 213 (HCI), which provides paths for data, audio, and control signals between the Bluetooth module and host.

Radio 210 completes the physical layer by providing a transmitter and receiver for two-way communication. Data packets are assembled and fed to the radio 210 by the baseband/link controller 211. The link controller of 211 provides more complex state operations, such as the standby, connect, and low-power modes. The baseband and link controller functions are combined into one layer to be consistent with their treatment in the Bluetooth Specification. Link manager 212 provides link control and configuration through a low-level language called the link manager protocol (LMP).

Logical link control and adaptation protocol (L2CAP) 214 establishes virtual channels between hosts that can keep track of several simultaneous sessions such as multiple file transfers. L2CAP 214 also takes application data and breaks it into Bluetooth-size portions for transmission, and reverses the process for received data. Radio Frequency Communication (RFCOMM) 215 is a Bluetooth serial port emulator, and its main purpose is to "trick" application 220 into thinking that a wired serial port exists instead of an RF link. Finally, various software programs that are needed for different Bluetooth usage models enable resident application 220 to use Bluetooth. These include service discovery protocol (SDP) 219, object exchange (OBEX), 216 telephony control protocol specification (TCS) 218, and Wireless Application Protocol (WAP) 217. Bluetooth radio 210 and baseband/link controller 211 consist of hardware that is typically available as one or two integrated circuits. Firmware-based link manager 212 and one end of the host controller interface 213, perhaps with a bus driver for connection to the host, complete the Bluetooth module shown in FIG. 2. The remaining parts of tile protocol stack and the host end of HCI 213 can be implemented in software on the host itself.

Figure 3:
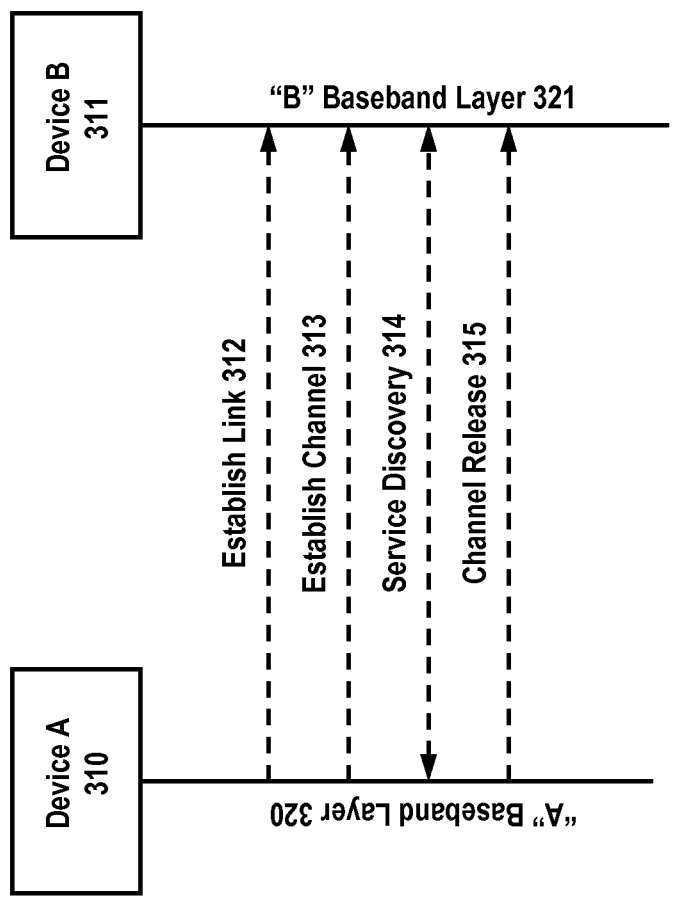
FIG. 3 illustrates an exemplary service discovery process.

FIG. 3 illustrates an exemplary Bluetooth discovery process utilizing "Device A" 310 and "Device B" 311 using each respective baseband layer (320, 321). Here, Device A 310 is initiating service discover while Device B 311 establishes communications in order to make it discoverable. The process may be assisted using a service discovery application from an access profile stored in each device.

The initial linking process 312 begins with an inquiry and page among devices in order to establish a piconet. In FIG. 3, Device A 310 is configured as a prospective slave (p-slave) and Device B 311 is a prospective master (p-master). As a p-master, Device B 311 must send its frequency hop synchronization (FHS) packet to a Device A 310 so the latter can use the same hop sequence and phase used by the master. Preferably, a predetermined hop sequence or set of sequences, are used for paging and inquiries. For inquiries, the p-master may not know about nearby devices, so a single common hop sequence (one sequence for sending an inquiry and another for responding to the inquiry) is used by all devices for initial device discovery. A p-slave responding to an inquiry sends its FHS packet, within which is its Bluetooth device address (BD_ADDR). Now the p-master can create a new hopping sequence based the BD_ADDR for transmitting a subsequent page for establishing a piconet with that p-slave.

Inquiries that are sent and replied by a device are typically transmitted at a device-specific default power setting. As a result, signal characteristics, such RSSI collected through an inquiry is relatively free from the side-effect of power control. Accordingly, a inquiry fetched RSSI may provide finer measurements than the connection-based RSSI.

For establishing channel 313, a hop channel set and the sequence of hops through the channel set may be determined by the lower 28 bits of a device's BD_ADDR, and the hop phase may be determined by the 27 most significant bits of CLK. These two values are sent to a hop generator, and the output of this generator goes to the Bluetooth radio's frequency synthesizer. In order to establish communications, Devices A and B should use the same hop channels, the same hop sequence from channel to channel, and the same phase so that they hop together. Also, one device should transmit while the other receives on the same frequency and vice versa. Multiple hop sequences and periods are configured to cover inquiry, page, and connect activity. These include channel hop sequence (used for normal piconet communications between master and slave(s)), page hop sequence (used by a p-master to send a page to a specific p-slave and to respond to the slave's reply), page response sequence (used by a p-slave to respond to a p-master's page), inquiry hop sequence (used by a p-master to send an inquiry to find Bluetooth devices in range), and inquiry response sequence (used by a p-slave to respond to a p-master's inquiry).

Service discovery 314 is used for retrieving information required to set up a transport service or usage scenario, and may also be used to access a device and retrieve its capabilities or to access a specific application and find devices that support that application. Retrieving capabilities requires paging a device and forming an Asynchronous Connectionless Link (ACL) to retrieve the desired information, accessing applications involves connecting to and retrieving information from several devices that are discovered via an inquiry. Thus, service discovery may be used for browsing for services on a particular device, searching for and discovering services based upon desired attributes, and/or incrementally searching a device's service list to limit the amount of data to be exchanged. An L2CAP channel with a protocol service multiplexer (PSM) is used for the exchange of service-related information. Service discovery can have both client and server implementations, with at most one service discovery server on any one device. However, if a device is client only, then it need not have a service discovery server. Each service is preferably listed in the device's SOP database as a service record having a unique ServiceRecordHandle, and each attribute of the service record is given an attribute ID and an attribute value. Attributes include the various classes, descriptors, and names associated with the service record. After service discovery is completed, the channel is released 315.

Figure 4:
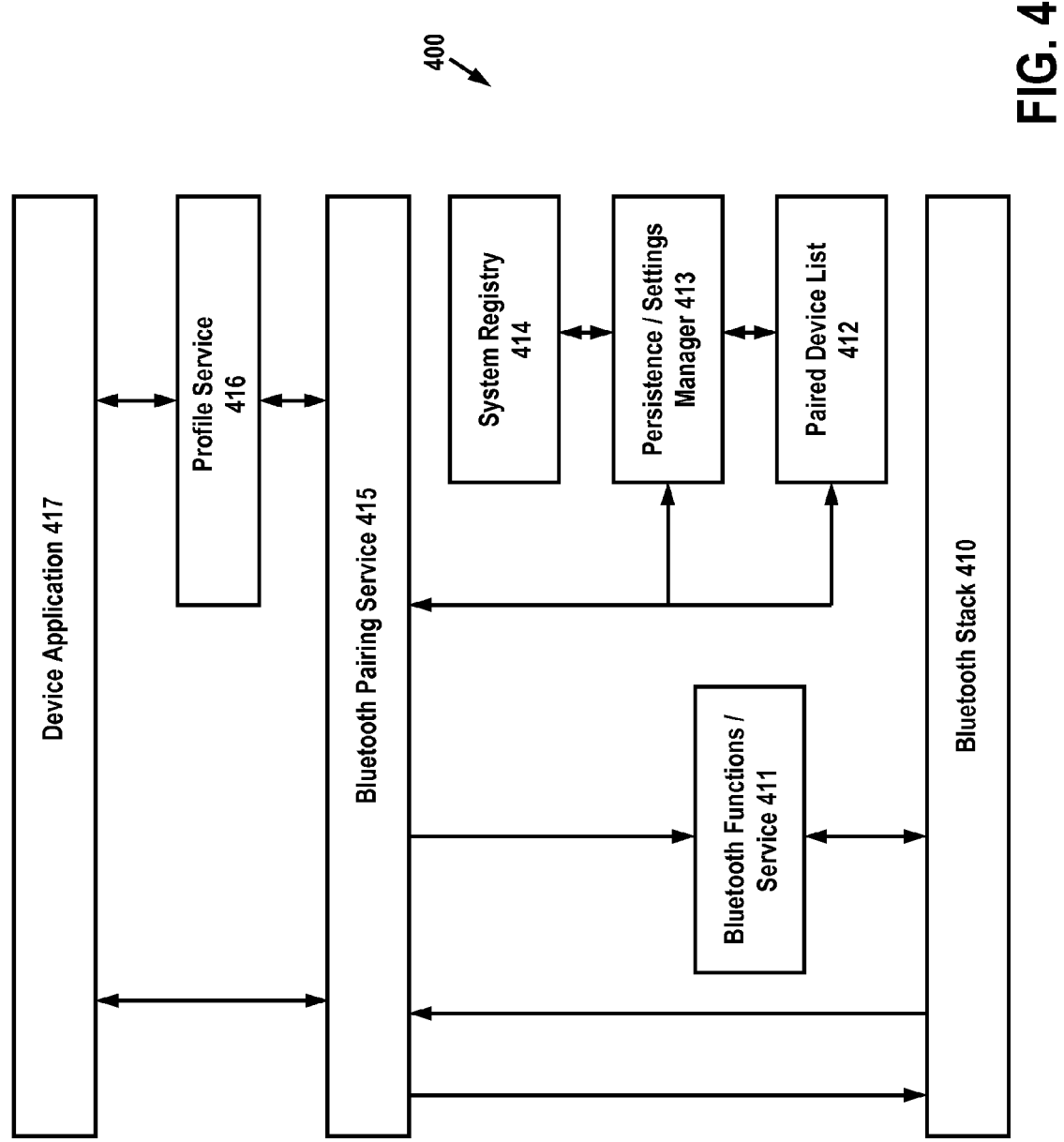
FIG. 4 illustrates an exemplary authentication mechanism for connected devices.

FIG. 4 illustrates an exemplary authentication configuration 400, where Bluetooth Pairing Service 415 sends API calls to Bluetooth Stack 410 and receives back pairing events. Bluetooth Stack 410 transmits API calls to Bluetooth helper service/function 411, which receives discovery enable signals (inquiry, page scan) from Bluetooth Pairing Service 415. Bluetooth pairing information for Pairing Service 415 is communicated from persistence/settings manager 413 and paired device list 412, which preferably retries information from system registry 414. Bluetooth Pairing Service 415 forwards information to device application 417, and may further retrieve and communicate profile services 416 to application 417 as well.

The authentication process verifies the identity of the device at the other end of a link. The verifier queries the claimant and checks its response; if correct, then authentication is successful. Authorization can be used to grant access to all services, a subset of services, or to some services when authentication is successful, but requires additional authentication based on some user input at the client device for further services. The last item is usually implemented at the application layer. For Bluetooth Pairing Services 415, two devices become paired when they start with the same PIN and generate the same link key, and then use this key for authenticating at least a current communication session. The session can exist for the life of a L2CAP link (for Mode 2 security) or the life of the ACL link (for Mode 3 security). Pairing can occur through an automatic authentication process if both devices already have the same stored PIN from which they can derive the same link keys for authentication. Alternatively, either or both applications can ask their respective users for manual PIN entry. Once devices are paired they can either store their link keys for use in subsequent authentications or discard them and repeat the pairing process each time they connect. If the link keys are stored, then the devices are "bonded," enabling future authentications to occur using the same link keys and without requiring the user to input the PIN again. The concept of "trust" applies to a device's authorization to access certain services on another device. A trusted device is previously authenticated and, based upon that authentication, has authorization to access various services. An untrusted device may be authenticated, but further action is needed, such as user intervention with a password, before authorization is granted to access services. Also, encryption may be used to further enhance security of connections.

Figure 5:
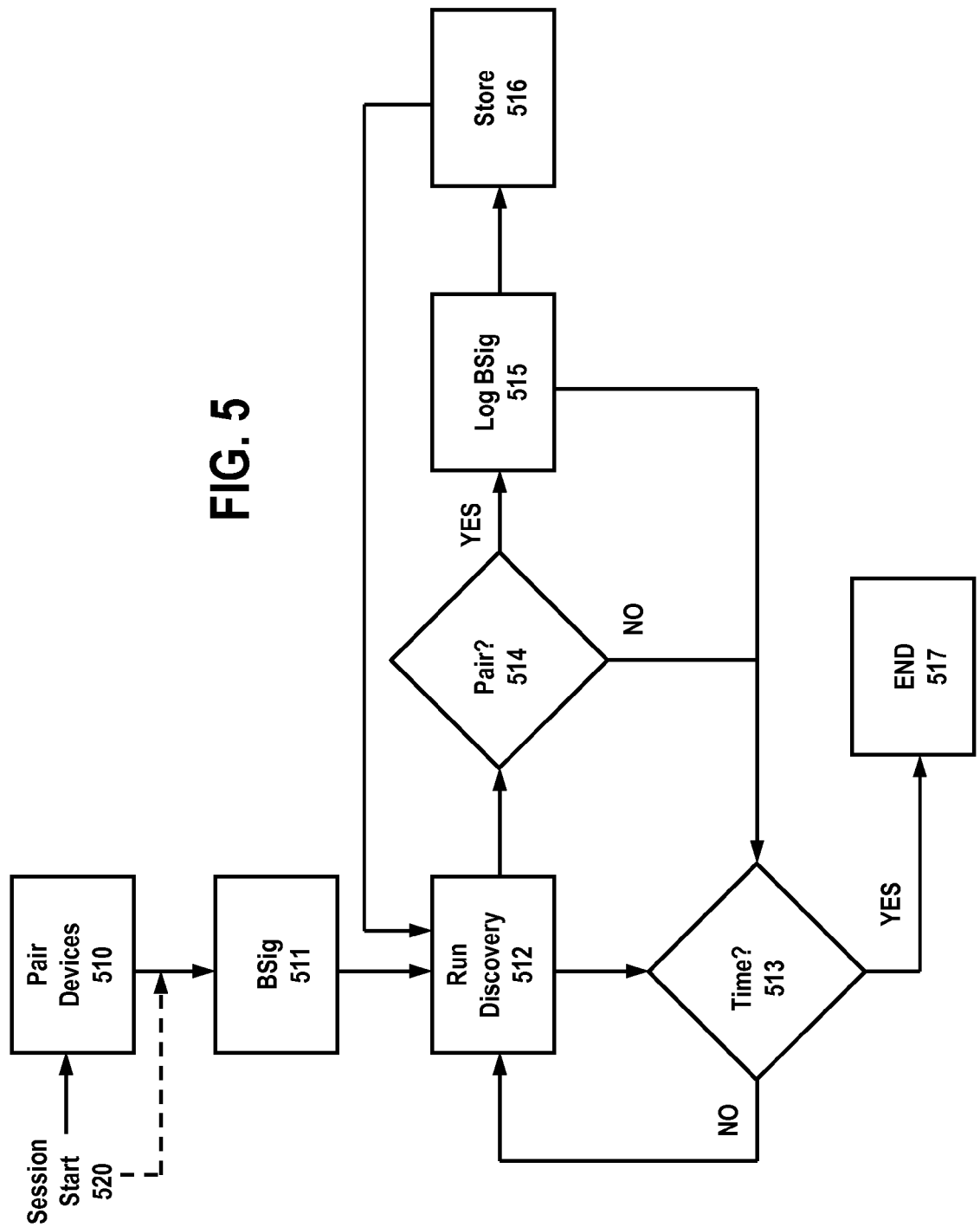
FIG. 5 is an exemplary flowchart for monitoring an RSSI Bluetooth signal characteristic.

FIG. 5 discloses one exemplary process for linking exposure to media data utilizing Bluetooth signal characteristics described above. In the beginning, a web session 520 starts, which triggers Bluetooth pairing of nearby devices 510. Once paired, the Blueetoth signal characteristics 511 ("BSig") are initially received. In the event that devices are already paired and/or bonded, the process starts by acquiring Bluetooth signal characteristics 511. Afterwards, a discovery process is run 512 for retrieving information for transport service or usage scenario, and may also be used to access a device and retrieve its capabilities or to access a specific application and find devices that support that application. Under one embodiment, a timer is used for media data exposure, wherein the timer can be set for specific time periods, or may alternately be set and used to correspond with web sessions or other events. When the timer 513 runs out, the process ends in 517. Otherwise, the process moves to 514, where the pairing is validated to ensure that a Bluetooth device is not moving out of range or otherwise compromising the connection. If the pairing validation produces a negative result, the process continues to look for the device via 512 for the time period 513. If the pairing validation is affirmative, the Bluetooth signal characteristics are logged 515 and stored 516 for the duration of the measurement (513). It should be understood that BSig block 515 may include Received Signal Strength Indicator (RSSI) value, a Transmit Power Level (TPL) value and/or a Link Quality (LQ) value It is understood that the examples above are provided as examples, and are not intended to be limiting in any way. Under an alternate embodiment, Bluetooth signal strengths may be approximated to determine distance. As explained above, an RSSI value provides the distance between the received signal strength and an optimal receiver power rank referred to as the "golden receiver power rank." The golden receiver power rank is limited by two thresholds. The lower threshold may be defined by an offset of 6 dB to the actual sensitivity of the receiver. The maximum of this value is predefined by −56 dBm. The upper threshold may be 20 dB over the lower one, where the accuracy of the upper threshold is about ±6 dB. Where S is assigned as the received signal strength, the value of S is determined by: (1) $S=RSSI+T_U$, for RSSI>0 and (2) $S=RSSI-T_L$, for RSSI<0, where $T_U=T_L+20$ DdB. Here, $T_U$ refers to the upper threshold, and $T_L$ refers to the lower threshold. The definition of the Bluetooth golden receiver limits the measurement of the RSSI to a distance. In order to measure the most unique characteristics of the signal, only measurements that result in a positive range of the RSSI should be considered for a functional approximation. The approximation may be calculated by choosing the best fitted function given by determining and minimizing the parameters of a least square sum of the signal strength measurements.

With regard to media data exposure measurement, the preferred embodiment collects research data on a computer processing device, associates it with the collected Bluetooth signal characteristics, and (a) transmits the research data and Bluetooth signal characteristics to a remote server(s) (e.g., collection server 121) for processing, (b) performs processing of the research data and Bluetooth signal characteristics in the computer processing device itself and communicates the results to the remote server(s), or (c) distributes association/processing of the research data and Bluetooth signal characteristics between the computer processing device and the remote server(s).

Under another embodiment, one or more remote servers are responsible for collecting research data on media data exposure. When Bluetooth signal characteristics are received from a computer processing device, the signal characteristics are associated with the research data (e.g., using time stamps) and processed. This embodiment is particularly advantageous when remote media data exposure techniques are used to produce research data. One technique, referred to as "logfile analysis," reads the logfiles in which a web server records all its transactions. A second technique, referred to as "page tagging," uses JavaScript on each page to notify a third-party server when a page is rendered by a web browser. Both collect data that can be processed to produce web traffic reports together with the Bluetooth signal characteristics. In certain cases, collecting web site data using a third-party data collection server (or even an in-house data collection server) requires an additional DNS look-up by the user's computer to determine the IP address of the collection server. As an alternative to logfile analysis and page tagging, "call backs" to the server from the rendered page may be used to produce research data. In this case, when the page is rendered on the web browser, a piece of Ajax code calls to the server (XMLHttpRequest) and passes information about the client that can then be aggregated.

Figure 6:
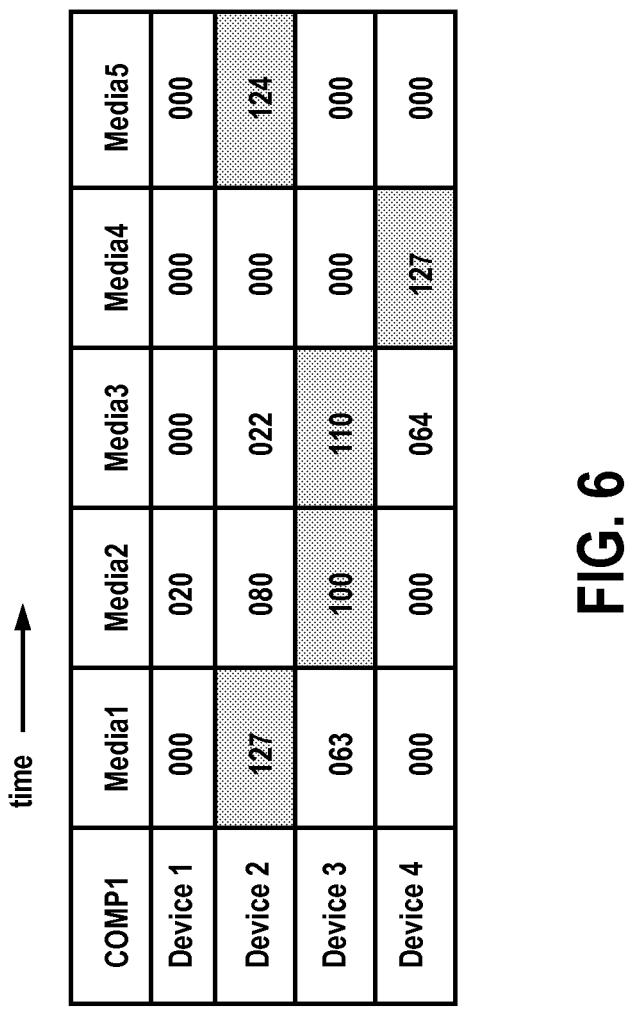
FIG. 6 illustrates an exemplary media exposure table for a plurality of media data that was exposed to one or more of a plurality of devices.

Turning to FIG. 6, an exemplary portion of a report utilizing Bluetooth signal characteristics is illustrated, where five different kinds of media data (Media1-Media5) were received on a computer processing device (COMP1). At that time, four portable computing devices (Device 1-Device 4) were either (a) previously paired with the computing device, or actively paired with the computing device during the media session in which the five media data were received. The body of the table in FIG. 6 is populated with the collected signal strengths (e.g., average RSSI) for each device. It this example, Device 1 had either a minimal connection (020) or no connection at all (000) throughout the session, and was therefore not credited with being exposed to any of the media data. Device 2 was measured as having the strongest signal strength for Media1 and Media 5 (0127 and 124, respectively), and was therefore credited with being exposed to the media data. While Device 2 was measured as being in proximity to computer processing device for Media2 and Media3, Device 3 was measured as having the strongest signal strength (100 and 110), and thus Device 3 received credit with being exposed to media data. Similarly, Device 4 was measured as having the strongest signal strength at the time Media4 was received, and thus receives the media exposure credit. Under one embodiment, threshold media strength can be implemented to reduce the possibility of "false positives" in crediting media exposure. In this example, if three devices are detected in a vicinity of a portable computing device, but the signal strengths are not sufficiently high enough, none of the devices are credited with being exposed to the media data.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A computer-implemented method for establishing media data exposure for a computer processing device, comprising the steps of:
   receiving media data in the computer processing device;
   pairing the computer processing device with a plurality of portable computing devices using a Bluetooth connection when media data is received;
   establishing a signal strength characteristic of the Bluetooth connection in the computer processing device for each of the paired plurality of portable computing devices;
   associating each signal strength characteristic with the received media data to determine which signal strength characteristic is the strongest when the media data was received in the computer processing device.

2. The computer-implemented method of claim 1, wherein the media data comprises at least one of audio, video, audio/video, text, an image, a web page and streaming media.

3. The computer-implemented method of claim 1, further comprising the steps of collecting exposure data relating to the media data, wherein the exposure data comprises at least one of a cookie, a logfile and a page tag.

4. The computer-implemented method of claim 1, wherein the signal strength characteristic of the Bluetooth connection comprises at least one Received Signal Strength Indicator (RSSI) value.

5. The computer-implemented method of claim 4, wherein the signal strength characteristic of the Bluetooth connection further comprises at least one of a Transmit Power Level (TPL) value and a Link Quality (LQ) value.

6. The computer-implemented method of claim 4, comprising the step of generating an overall signal strength by averaging the RSSI values for each portable computing device in the computer processing device during the time in which the media data is received.

7. The computer-implemented method of claim 1, wherein media exposure credit is given to the portable computing device with the strongest signal strength characteristic at the time the media data is received.

8. A computer-implemented method for establishing media data exposure, comprising the steps of:
- receiving media exposure data relating to media data that was received in a computer processing device;
- receiving a plurality of signal strength characteristic data relating to Bluetooth connections made between the computer processing device and a plurality of portable computing devices;
- associating each signal strength characteristic with the received media data to determine which signal strength characteristic is the strongest when the media data was received in the computer processing device.

9. The computer-implemented method of claim 8, wherein the media data comprises at least one of audio, video, audio/video, text, an image, a web page and streaming media.

10. The computer-implemented method of claim 8, further comprising the steps of collecting exposure data relating to the media data, wherein the exposure data comprises at least one of a cookie, a logfile and a page tag.

11. The computer-implemented method of claim 8, wherein the signal strength characteristic of the Bluetooth connection comprises at least one Received Signal Strength Indicator (RSSI) value.

12. The computer-implemented method of claim 11, wherein the signal strength characteristic of the Bluetooth connection further comprises at least one of a Transmit Power Level (TPL) value and a Link Quality (LQ) value.

13. The computer-implemented method of claim 11, comprising the step of generating an overall signal strength by averaging the RSSI values for each portable computing device in the computer processing device during the time in which the media data is received.

14. The computer-implemented method of claim 8, wherein media exposure credit is given to the portable computing device with the strongest signal strength characteristic at the time the media data is received.

15. A computer-implemented method for establishing media data exposure for a computer processing device, comprising the steps of:
- storing media exposure data relating to media data received in the computer processing device;
- receiving pairing data related to the pairing of the computer processing device with a plurality of portable computing devices using a Bluetooth connection when media data is received;
- processing a signal strength characteristic of the Bluetooth connection in the computer processing device for each of the paired plurality of portable computing devices;
- associating each signal strength characteristic with the received media data to determine which signal strength characteristic is the strongest when the media data was received in the computer processing device; and
- associating the strongest signal strength characteristic with the media exposure data.

16. The computer-implemented method of claim 15, wherein the media data comprises at least one of audio, video, audio/video, text, an image, a web page and streaming media.

17. The computer-implemented method of claim 15, further comprising the steps of collecting exposure data relating to the media data, wherein the exposure data comprises at least one of a cookie, a logfile and a page tag.

18. The computer-implemented method of claim 15, wherein the signal strength characteristic of the Bluetooth connection comprises at least one Received Signal Strength Indicator (RSSI) value.

19. The computer-implemented method of claim 18, wherein the signal strength characteristic of the Bluetooth connection further comprises at least one of a Transmit Power Level (TPL) value and a Link Quality (LQ) value.

20. The computer-implemented method of claim 18, comprising the step of generating an overall signal strength by averaging the RSSI values for each portable computing device in the computer processing device during the time in which the media data is received.

* * * * *